Nov. 30, 1937.  L. C. ROESS ET AL  2,100,919
OBSERVATION CHAMBER FOR FLOWING LIQUIDS
Filed Oct. 15, 1935
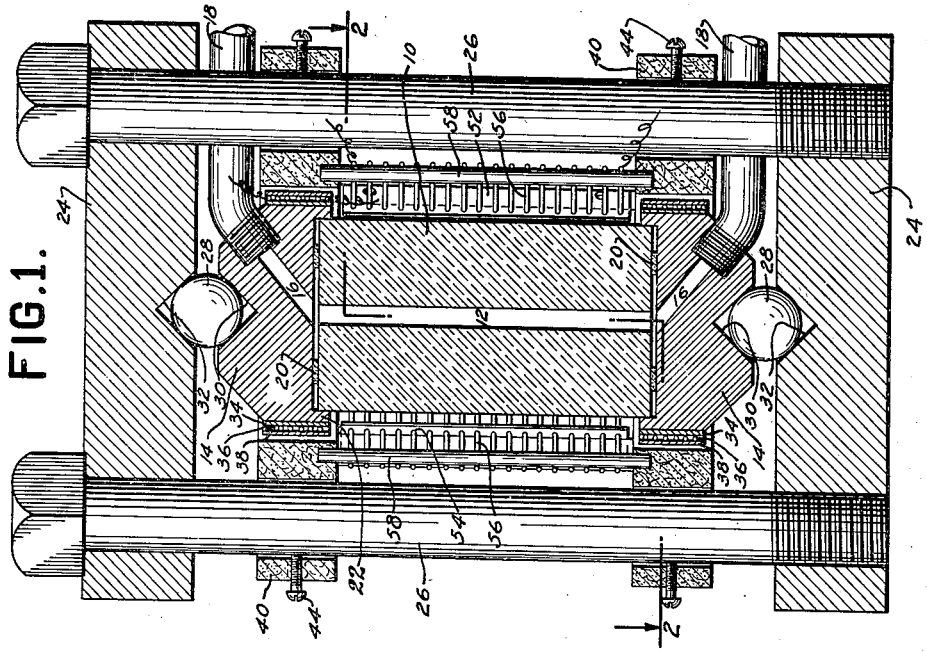
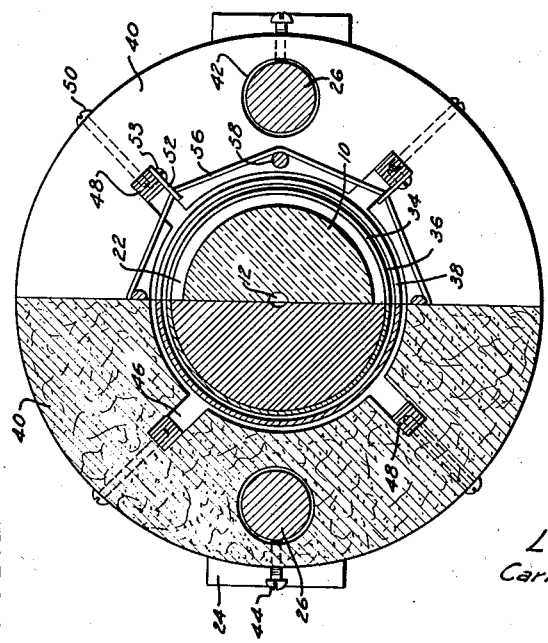
Louis C. Roess
Carl E. Cummings
INVENTORS
BY R. J. Dearborn
their ATTORNEY Patented Nov. 30, 1937

2,100,919

UNITED STATES PATENT OFFICE 2,100,919

OBSERVATION CHAMBER FOR FLOWING LIQUIDS

Louis C. Roess and Carl E. Cummings, Beacon, N. Y., assignors to The Texas Company, New York, N. Y., a corporation of Delaware Application October 15, 1935, Serial No. 45,168

5 Claims. (Cl. 116—117)

This invention relates to observation chambers and more particularly to devices for permitting visual inspection of a liquid flowing under extremely high pressure and temperature.

The principal object of the invention is the provision of a device of this type which can be connected in a conduit containing a heated liquid under a high temperature and pressure and by means of which the liquid can be readily seen while leakage is prevented. Another object of the invention is the provision of heating means for the observation chamber so that the liquid will not be cooled while passing through the device.

In oil treating and cracking operations it is often necessary to visually observe the hot oil so that the color, for instance, of recycle stock can be readily determined. The gauge glasses and other devices which have been used heretofore have had certain disadvantages. In some of these the liquid chamber is too large, thus permitting undue cooling of the liquid, and in others difficulty has been encountered in forming and maintaining a pressure tight seal between the glass or transparent member and the conduits carrying the liquid, especially those exposed to high temperatures. Not infrequently in endeavoring to tighten the joint between the transparent member and the conduit these members are forced out of line and leakage results with the attendant danger of fire or explosion.

In carrying out this invention the disadvantages enumerated in the foregoing paragraph have been eliminated and a successful fluid tight observation chamber has resulted. In accordance with the invention a transparent member of fused quartz and having a relatively small center opening or chamber is mounted between two cap or closure members having passages connecting with the opening in the quartz unit and with the conduit containing the fluid to be observed. Ball and cone joints are provided between the cap members and a suitable frame, the latter having provision for tightening the joints between the cap members and the quartz unit. Electrical heating means are provided for the chamber so that the fluid will not be cooled in passing therethrough.

For a better understanding of the invention reference may be had to the accompanying drawing in which Fig. 1 is a side elevation showing a center section of the device, and Fig. 2 is a sectional plan view taken on line 2—2 of Fig. 1.

Referring to the drawing, the observation chamber proper is formed of a cylindrical member 10 of a transparent material capable of withstanding high pressures. The member 10 is preferably formed of fused quartz and is provided with a longitudinal center opening or chamber 12 through which the oil passes while it is being inspected. The chambered member 10 is mounted between a pair of cap or closure members 14 which are provided with passages 16, the inner ends of which are in alignment with the chamber 12. A pair of conduits 18 for conducting the oil to be inspected are shown as having threaded connection with the cap members 14 at the outer ends of the openings 16 but the conduits may of course be connected to the members 14 by other means such as by welding. A pair of annular gaskets 20 of a suitable material such as copper are mounted in the joints between the cap members 14 and the quartz cylinder 10. The members 14 are preferably provided with flanges 22 surrounding the ends of the quartz member 10 so as to aid in keeping the members in alignment. It is preferred that the members 14 be formed of a material such as invar steel which will not expand or contract with temperature changes.

In order to maintain liquid tight joints between the cap members 14 and the quartz member 10 and to keep these members in alignment at all times an adjustable supporting frame has been provided, this frame comprising a pair of bars 24 and a pair of elongated bolts 26. The bolts pass through suitable openings in the upper bar 24 and are threaded into corresponding openings in the lower bar. A pair of ball and cone joints are provided between the bars 24 and the cap members 14, each of these joints comprising a metal ball 28 which fits into a conical opening or depression 30 in the outer side of a cap member 14 and a corresponding conical opening 32 in one of the bars 24. It will thus be seen that by screwing the bolts 26 into the bar 24, the joints between the invar members 14 and the quartz cylinder will be tightened without these members being forced out of alignment.

In order to heat the quartz cylinder 10 and the members 14 so that the oil will not be cooled as it passes through these members electrical heating elements are provided. A layer 34 of a suitable electrical insulating material such as mica is placed around the periphery of each of the cap members 14 and a coil of electrical resistance wire 36 is then wound around the mica layer. A second mica layer 38 is preferably placed around the resistance wire to hold the latter in place.

A pair of annular members 40 of suitable electrical insulating material not affected by heat, such as "Transite", are provided with spaced openings 42 adapted to be aligned with the bolts 26 of the supporting frame. The bolts 26 are placed through the holes 42 when the device is being assembled, suitable screws 44 serving to hold the insulating members 40 in the desired position. The members 40 are provided with a plurality of slots 46 and in correspondingly aligned slots a plurality of posts 48 are secured by means of suitable screws or bolts 50. The posts 48 are preferably formed of some light metal such as aluminum and to one side of each post a strip of mica 52 is secured by suitable screws 53. Each mica strip is arranged so that one side or edge will project radially toward the center of the quartz cylinder 10 and the projecting sides of the strips are provided with a plurality of small holes 54. A coil 56 of electrical resistance wire is then placed on the framework formed by the mica strips 52, the turns of the wire being threaded through the holes 54 in the strips.

If desired, additional supporting members may be provided for the winding 56 and for this purpose a plurality of electrical and heat insulating rods 58 are shown as supported between the annular members 40, one rod being arranged midway between each adjoining pair of aluminum posts 48. However, with the usual size of wire employed, the inherent rigidity of the wire will eliminate the necessity for such additional supports. The coils 36 surrounding the invar cap members 14 and the coil 56 surrounding the quartz cylinder 10 are, of course, to be connected to any suitable source of electrical current and by regulating the amount of current passing through the coils the temperature of the quartz cylinder 10 and the members 14 can be made to coincide substantially with the temperature of the oil passing through these members for observation.

From the foregoing description it will be seen that a simple and sturdy device has been provided by means of which a flowing liquid such as oil can be observed without any appreciable cooling of the liquid taking place and without danger of leakage. If any coke should be formed in the chamber 12 of the quartz cylinder it may easily be removed by burning in place or by chemical solution when the device is taken apart, which latter is a simple operation. One of these devices has been used in observing oil under 500 pounds per square inch pressure and at 1000° F. and if the various elements are suitably designed, the device could obviously be used at much higher pressures and temperatures.

Obviously, many other modifications and variations of the invention, as hereinbefore set forth, may be made without departing from the spirit and scope thereof, and therefore only such limitations should be imposed as are indicated in the appended claims.

We claim—

1. In an observation chamber for flowing liquids, a cylinder of fused quartz provided with a longitudinal passage of relatively small bore for the liquid to be observed, a cap member for each end of said quartz member, said cap member being provided with openings adapted to connect the passage in said quartz member with a conduit carrying the liquid to be observed, the openings in said cap members being of substantially the same bore as the opening in said cylinder, and a supporting frame encircling said cylinder, said frame including means for forcing said cap members toward said quartz member so as to form a liquid tight joint between each of said cap members and said quartz member.

2. In an observation chamber for flowing liquids, a transparent cylinder provided with a longitudinal passage for the liquid to be observed, a cap member for each end of said cylinder, said cap members being provided with openings adapted to connect the passage in said cylinder with a conduit carrying the liquid to be observed, a supporting frame for said cylinder and said cap members, electrical heating means for said cylinder and said cap members, said heating means comprising a spiral coil of electrical resistance wire disposed around the periphery of each of said cap members, a third spiral coil of electrical resistance wire disposed around said cylinder the turns of said third coil being separated from each other and spaced from said transparent cylinder, and an electrical insulating framework for supporting said third coil from said first mentioned frame, said coils being adapted to be connected to a source of electrical supply.

3. In an observation chamber for flowing liquids, a substantially cylindrical member of fused quartz provided with an axial passage of relatively small bore as compared to the outside diameter of said cylindrical member for the liquid to be observed, a cap member for each end of said cylinder, an annular gasket between each of said cap members and the adjacent end of said cylinder, said cap members being provided with openings adapted to connect the passage in said cylinder with a conduit carrying the liquid to be observed, a supporting frame for said cylinder, said frame comprising a pair of parallel bars and a pair of elongated screws connecting the ends of said bars, said screws adapted when tightened to draw said bars toward each other, the inner sides of said bars and the outer sides of said cap members being provided with aligned conical indentations, and a pair of balls each adapted to fit within an adjacent pair of indentations.

4. In an observation chamber for flowing liquids, a member of fused quartz provided with a longitudinal passage of relatively small bore for the liquid to be observed, a cap member for each end of said quartz member, said cap members being provided with openings adapted to connect the passage in said quartz member with a conduit carrying the liquid to be observed, the openings in said cap members being of substantially the same bore as the passage in said quartz member, a supporting frame for said quartz member, said frame including means for forcing said cap members toward said quartz member so as to form a liquid tight joint between each of said cap members and said quartz member and means for controlling the temperature of said quartz member and said cap members comprising electrical heating coils surrounding said quartz and cap members, the coil surrounding said quartz member being spaced therefrom and the turns of said coil being slightly separated from each other, said coils being adapted to be connected to a source of electrical supply.

5. In an observation chamber for flowing liquids, a cylinder of fused quartz provided with an axial passage for the liquid to be observed, a cap member for each end of said cylinder, an annular gasket between each of said cap members and the adjacent end of said cylinder, said cap members being provided with openings adapted to connect the passage in said cylinder with a conduit carrying the liquid to be observed, and a supporting frame for said cylinder, said frame including means for forcing said cap member toward said cylinder so as to compress said gaskets and form a liquid tight joint between each of said cap members and said cylinder, electrical heating means for said cylinder and said cap members, said heating means comprising a coil of electrical resistance wire disposed around the periphery of each of said cap members, a third coil of electrical resistance wire disposed around said quartz cylinder, and an electrical insulating framework for supporting said third coil from said first mentioned frame and for holding the turns of said third coil in spaced relation to each other and to the quartz cylinder, said coils being adapted to be connected to a source of electrical supply.

LOUIS C. ROESS.
CARL E. CUMMINGS.